United States Patent
Baldwin et al.

(10) Patent No.: US 9,218,813 B2
(45) Date of Patent: Dec. 22, 2015

(54) VOICE AND/OR FACIAL RECOGNITION BASED SERVICE PROVISION

(71) Applicant: INTEL CORPORATION, Santa Clara, CA (US)

(72) Inventors: James A. Baldwin, Palo Alto, CA (US); Guangli Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 13/995,476

(22) PCT Filed: Mar. 14, 2013

(86) PCT No.: PCT/CN2013/072590
§ 371 (c)(1),
(2) Date: Jun. 18, 2013

(87) PCT Pub. No.: WO2014/139117
PCT Pub. Date: Sep. 18, 2014

(65) Prior Publication Data
US 2015/0134330 A1 May 14, 2015

(51) Int. Cl.
G10L 15/16 (2006.01)
G10L 15/20 (2006.01)
G10L 17/18 (2013.01)
G06F 21/32 (2013.01)
H04L 9/32 (2006.01)
G06K 9/00 (2006.01)
G10L 17/06 (2013.01)

(52) U.S. Cl.
CPC ............... *G10L 17/18* (2013.01); *G06F 21/32* (2013.01); *G06K 9/00288* (2013.01); *G10L 17/06* (2013.01); *H04L 9/3231* (2013.01); *G06F 2221/2111* (2013.01)

(58) Field of Classification Search
None
See application file for complete search history.

(56) References Cited

U.S. PATENT DOCUMENTS

| 8,028,896 | B2 * | 10/2011 | Carter et al. | 235/379 |
| 8,181,858 | B2 * | 5/2012 | Carter et al. | 235/379 |
| 8,311,522 | B1 * | 11/2012 | Nunally | 455/414.1 |
| 2006/0056662 | A1 * | 3/2006 | Thieme et al. | 382/115 |

(Continued)

FOREIGN PATENT DOCUMENTS

| CA | 2317205 | 2/2002 |
| CN | 101111053 | 1/2008 |

(Continued)

OTHER PUBLICATIONS

International Search Report & Written Opinion, issued in PCT Patent Application No. PCT/CN2013/072590, mailed Dec. 19, 2013, 11 pages.

*Primary Examiner* — Satwant Singh
(74) *Attorney, Agent, or Firm* — Schwabe, Williamson & Wyatt, P.C.

(57) ABSTRACT

Apparatuses, methods and storage medium associated with voice and/or facial recognition based service provision are disclosed herein. In embodiments, an apparatus may include a voice recognition engine and a facial recognition engine configured to provide, individually or in cooperation with each other, identification of a user at a plurality of identification levels. The apparatus may further include a service agent configured to provide a service to a user of the apparatus, after the user has been identified at least at an identification level required to receive the service. Other embodiments may be described and/or claimed.

26 Claims, 4 Drawing Sheets

(56) References Cited

U.S. PATENT DOCUMENTS

| | | |
|---|---|---|
| 2006/0102717 A1* | 5/2006 | Wood et al. .................. 235/382 |
| 2006/0174119 A1 | 8/2006 | Xu |
| 2007/0041323 A1 | 2/2007 | Kitahara et al. |
| 2007/0130588 A1* | 6/2007 | Edwards et al. ............... 725/59 |
| 2009/0157454 A1* | 6/2009 | Carter et al. ..................... 705/7 |
| 2009/0157560 A1* | 6/2009 | Carter et al. .................... 705/80 |
| 2013/0246270 A1* | 9/2013 | Du et al. ........................ 705/44 |
| 2013/0282580 A1* | 10/2013 | O'Brien et al. ................ 705/44 |
| 2014/0007154 A1* | 1/2014 | Seibold et al. ................. 725/25 |

FOREIGN PATENT DOCUMENTS

| | | |
|---|---|---|
| CN | 101651541 | 2/2010 |
| WO | 2011/049784 | 4/2011 |

* cited by examiner

VOICE AND/OR FACIAL RECOGNITION BASED SERVICE PROVISION

CROSS REFERENCE TO RELATED APPLICATIONS

The present application is a national phase entry under 35 U.S.C. §371 of International Application No. PCT/CN2013/072590, filed Mar. 14, 2013, entitled "VOICE AND/OR FACIAL RECOGNITION BASED SERVICE PROVISION", which designated, among the various States, the United States of America. The Specification of the PCT/CN2013/072590 Application is hereby incorporated by reference.

TECHNICAL FIELD

The present disclosure relates to the field of data processing, in particular, to apparatuses, methods and storage medium associated with voice and/or facial recognition based service provision.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the usage of online services, from consumption of multi-media content, to ecommerce and financial services, to name just a few. Users often prefer to access the wide range of services with the same client device. However, the security requirements often vary greatly between the different services, from one end of the spectrum, like viewing a video file online, to the other end, like conducting banking transactions online. Current art lacks a coherent user-friendly offering that can reliably meet a large range of the security requirements of the different online services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with voice and/or facial recognition based service provision are disclosed herein. In embodiments, an apparatus, e.g., a set-top box or a computing tablet, may include a voice recognition engine and a facial recognition engine configured to provide, individually or in cooperation with each other, identification of a user at a plurality of identification levels. The apparatus may further include a service agent configured to provide a service to a user of the apparatus, after the user has been identified at least an identification level required to receive the service. Examples of a service agent may include an enhanced media player for consuming multi-media content, or an enhanced browser for conducting ecommerce or online financial transactions.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
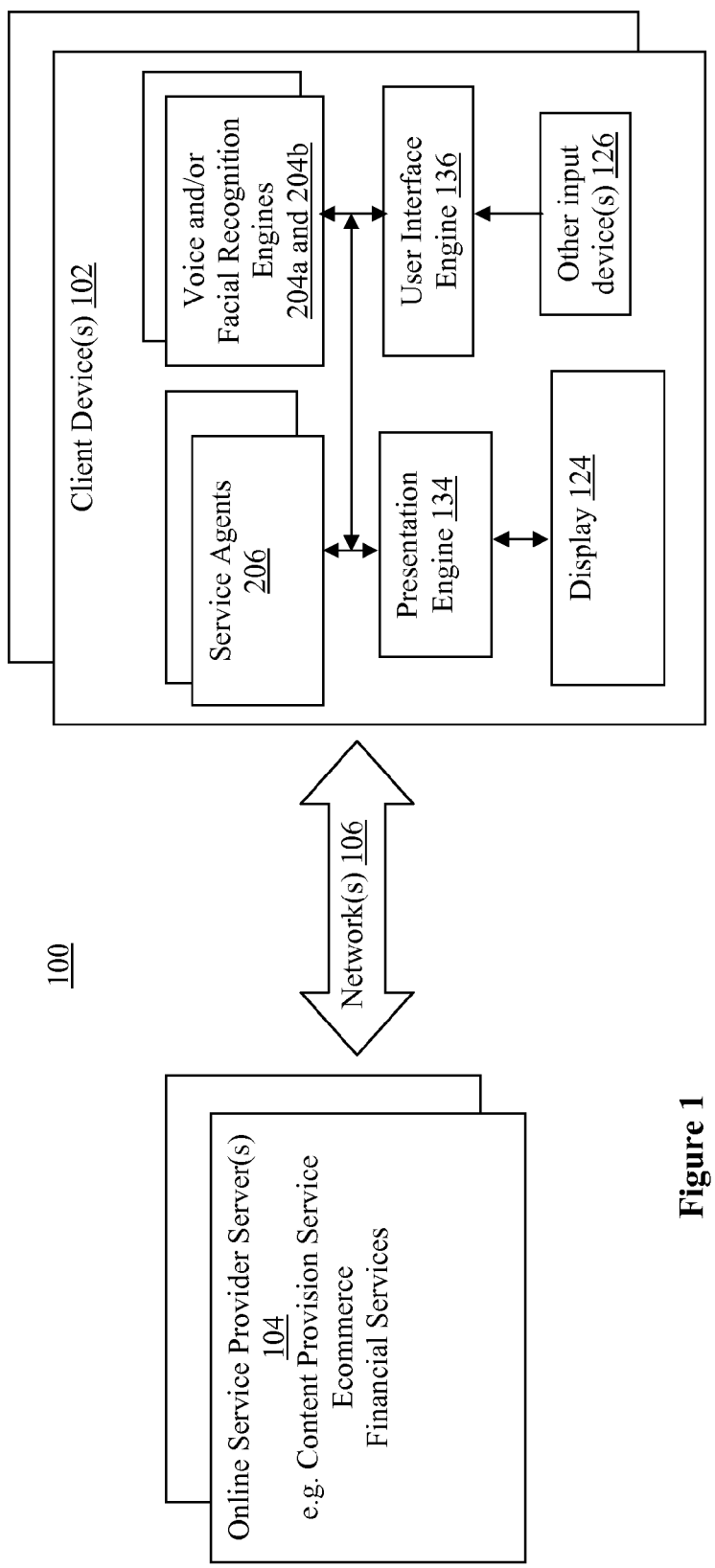
FIG. 1 illustrates an overview of a computing environment, including a client device, suitable for practicing the present disclosure, in accordance with various embodiments.

Referring now FIG. 1, wherein a computing environment, including a client device, for practicing the present disclosure, in accordance with various embodiments, is illustrated. As shown, in embodiments, environment 100 may include a number of client devices 102 coupled to a number of servers 104 of online service providers, via networks 106. Servers 104 may be configured to provide a wide range of online services, having different user identification requirements. Examples of such online services and theirs providers may include, but are not limited to, user customized multi-media content services provided by content distributors, such as Cable Television providers or online multi-media content providers like Youtube, Netflix, and so forth, ecommerce facilitated by hosts, such as, Ebay, Best Buy and so forth, or financial services provided by financial institutions, such as Bank of America, Etrade, and so forth. As will be described in more detail below, in embodiments, client devices 102 may be configured to provide potentially a more coherent, user friendly and reliable approach to providing various levels of user identifications to meet the different user identification requirements of the different online services.

In embodiments, some online services may require only voice recognition of a user based on the voice characteristics of a user. Other online services may require only facial recognition of a user based on the user's facial features. Still other online services may require both the earlier described voice and facial recognitions of a user, and potentially, even other more sophisticated voice and/or facial recognition identifications, to be described more fully below.

In embodiments, as shown, a client device 102 may include voice and facial recognition engines 204a and 204b, and a number of service agents 206, coupled with each other as shown. Further, in embodiments, client device 102 may include presentation engine 134, user interface engine 136, display 124 and user input device 126, coupled with each other, engines 204a and 204b and agents 206 as shown. In embodiments, to facilitate cooperative usage of voice and facial recognition engines 204a and 204b, client device 102 may further include a common interface (not shown) to the engines 204a and 204b.

In embodiments, voice and facial recognition engines 204a and 204b may be configured to provide, individually or in cooperation with each other, user identifications at a number of identification levels. In embodiments, voice recognition engine 204a may be configured to provide an identification of a user, based on the vocal characteristics of the user's voice, whereas facial recognition engine 204b may be configured to provide an identification of a user, based on the user's facial features. In embodiments, voice recognition engine 204a and facial recognition engine 204b may collaborate to provide the above identifications. For example, in some embodiments, voice recognition engine 204a may be first employed to narrow down the identification of a user to a number of potential identifications, and facial recognition engine 204b may then be employed make the final identification based on the narrowed down list of potential identifications. In other embodiments, the cooperation may be reversed, that is, facial recognition engine 204b may be first employed to narrow down the identification of a user to a number of potential identifications, and voice recognition engine 204a may then be employed to make the final identification based on the narrowed down list of potential identifications. Thus, for these cooperative embodiments, a less precise (and typically less computational intensive) technique may be implemented for the first employed recognition engine, and a more precise (and typically more computational intensive) technique may be implemented by the latter employed recognition engine. Together, the cooperative approach may yield more accurate identification, but with overall less computations, and thus more effective as well as more efficient.

Thus, depends on embodiments, voice recognition engine 204a may implement any one or more of a wide range of vocal recognition techniques to compare a voice input of a user to a number of voice templates to identify the user. The wide range of vocal recognition techniques may include, but are not limited to, a frequency estimation technique, a Markov model technique, a Guassian mixture model technique, a pattern matching technique, a neural network technique, a matrix representation technique, a vector quantization technique or a decision tree technique. Similarly, facial recognition engine 204b may implement any one or more of a wide range of facial recognition techniques to compare an image input of the user to a number of reference images. The wide range of vocal recognition techniques may include, but are not limited to, analysis of relative positions, sizes or shapes of eyes, nose, cheekbones, or jaws.

In embodiments, voice recognition engine 204a may be further configured to identify the semantic content of a voice input, to enable e.g., a required passphrase to log into an online service to be provided via a voice input. In other embodiments, voice and facial recognition engine 204a and 204b may be further configured to cooperate to identify whether a voice input is attenuation synchronized with the lip movement as seen with a companion series of image inputs. The identification of synchronization may be provided by the common interface to both engines 204a and 204b, based on the analyses of the two engines 204a and 204b. In other embodiments, voice and facial recognition engine 204a and 204b may be further configured to cooperate to identify whether a voice input is location synchronized with the companion image input, that is whether the location of the voice source that provided the voice input is the same as the location of the object of the image input. In embodiments, client device 102 may include a location service, such as, a global positioning system (GPS) component, e.g., as one of the other input devices 126.

Still referring to FIG. 1, services agents 204 may be configured to provide and/or facilitate various online services for users of client devices 102. Examples of service agents and services facilitated may include, but are not limited to, a multi-media player configured to facilitate provision of multi-media content service, including user customized service, a browser configured to facilitate access to ecommerce or financial services, and so forth. These multi-media players and browsers would be enhanced versions to utilize the multi-level identification services provided by voice and/or facial recognition engines 204a and 204b. Thus, except for the usage of the multi-level identification services provided by voice and/or facial recognition engines 204a and 204b, service agents 204 are intended to represent a broad range of service agents found on client devices, including but are not limited to, multi-media players, browsers, or service specific applications.

In embodiments, presentation engine 134 may be configured to present content to be displayed on display 124, in response to user selections/inputs. User interface engine 136 may be configured to receive the user selections/inputs from a user. Further, in various embodiments, presentation engine 136 and user engine 136 may be configured to effectuate adaptation of the presentation of a content to enhance user experience during response to some user commands, where the adaptation is in addition to a nominal response to the user commands. See e.g. U.S. patent application Ser. No. 13/727,138, entitled "CONTENT PRESENTATION WITH ENHANCED USER EXPERIENCE," filed Dec. 26, 2012.

Display 124 is intended to represent a broad range of display devices/screens known in the art, whereas input devices 126 is intended to represent a broad range of input devices known in the art including, but are not limited to, (hard or soft) keyboards and cursor control devices, microphones for voice inputs, cameras for image inputs, and so forth. While shown as part of a client device 102, display 124 and/or user input device(s) 126 may be standalone devices or integrated, for different embodiments of client devices 102. For example, for a television arrangement, display 124 may be a stand alone television set, Liquid Crystal Display (LCD), Plasma and the like, while elements 204, 206, 134 and 136 may be part of a separate set-top box, and other user input device 126 may be a separate remote control or keyboard. Similarly, for a desktop computer arrangement, a chassis hosting a computing platform with elements 204, 206, 134 and 136, display 124 and other input device(s) 126 may all be separate stand alone units. On the other hand, for a laptop, ultrabook, tablet or smartphone arrangement, elements 204, 206, 134 and 136, display 124 and other input devices 126 may be integrated together into a single form factor. Further, for tablet or smartphone arrangement, a touch sensitive display screen may also serve as one of the other user input device(s) 126, and elements 204, 206, 134 and 136 may be components of a computing platform with a soft keyboard that also include one of the user input device(s) 126.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G and beyond networks. It would be appreciated that at the server end, networks 106 may include one or more local area networks with gateways and firewalls, through which servers 104 go through to communicate with client devices 102. Similarly, at the client device end, networks 106 may include base stations and/or access points, through which client devices 102 communicate with servers 104. Within each of client devices 102 and servers 104, there may be communication/network interfaces, and in between the two ends may be any number of network routers, switches and other networking equipment of the like. However, for ease of understanding, these communication/network interfaces, gateways, firewalls, routers, switches, base stations, access points and the like are not shown.

Figure 2:
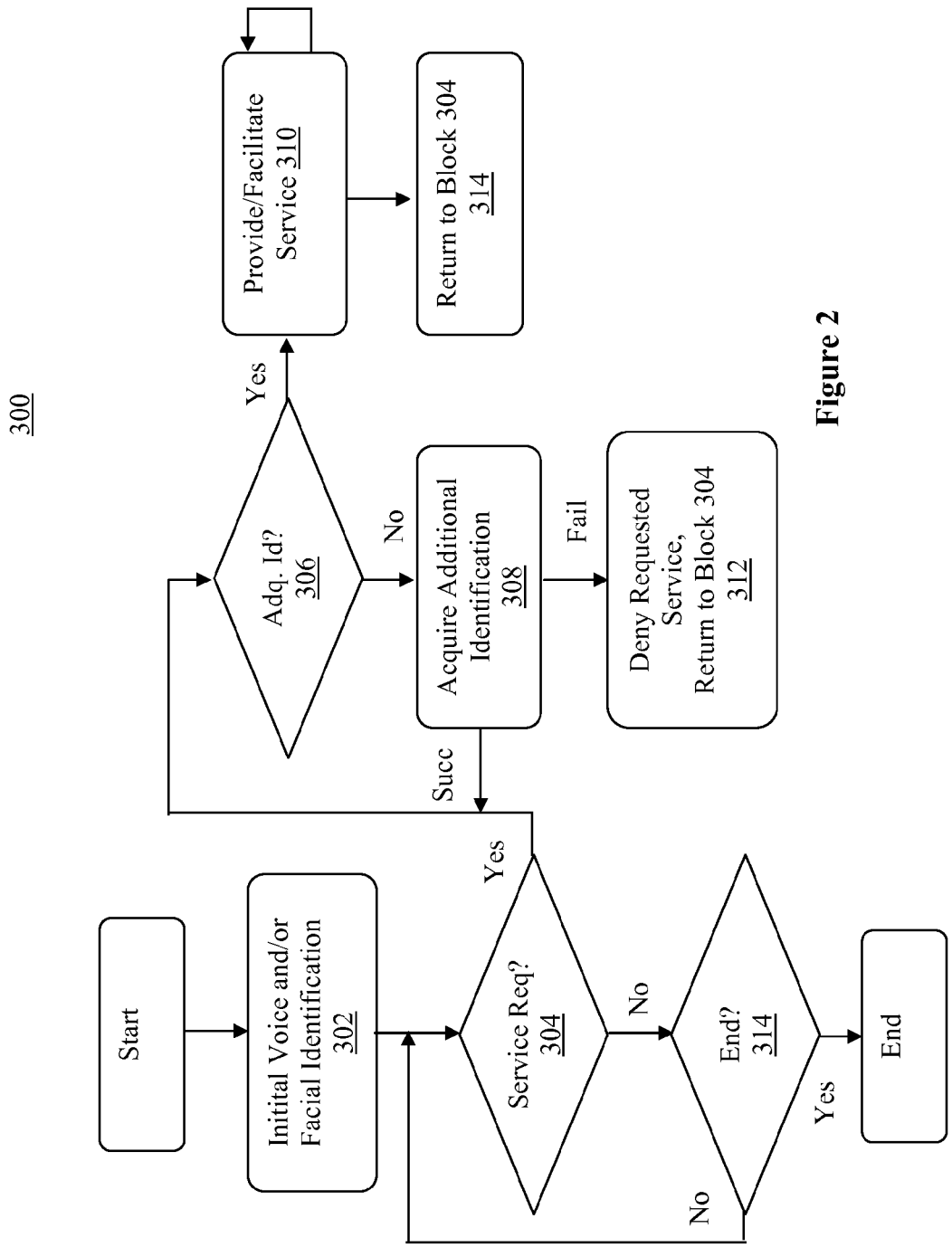
FIG. 2 illustrates an example process of voice and/or facial recognition based service provision, in accordance with various embodiments.

Referring now to FIG. 2, wherein an example process for presenting content, in accordance with various embodiments, is illustrated. As shown, process 300 may start at block 302, wherein an initial voice and/or facial identification may be established by voice and/or facial recognition engines 204a and 204b. As described earlier, the initial voice identification may be made by voice recognition engine 204a by comparing a voice input of the user to a number of voice templates, using any one of a number of voice recognition techniques earlier described. The initial facial identification may be made by facial recognition engine 204b by comparing an image input that includes the user to a number of reference images, using any one of a number of facial feature analysis techniques earlier described. Further, as earlier described, the initial voice and facial identifications may be cooperatively made by voice and facial recognition engines 204a and 204b.

From block 302, process 300 may proceed to block 304. At block 304, a determination may be made, e.g. by each of the service agents 206, on whether a service is requested. If a result of the determination, e.g., by one of the service agent 206, indicates that a service is requested of the service agent 206, for the service agent, process 300 may proceed from block 304 to block 306. At block 306, another determination may be made, e.g., by the service agent 206, on whether the current level of identification of the user is sufficient or adequate to allow access to the requested service. If a result of the determination indicates that the current level of identification is sufficient or adequate to allow access to the requested service, for the service agent 206, process 300 may proceed from block 306 to block 310.

If a result of the determination indicates that the current level of identification is insufficient or inadequate to allow access to the requested service, process 300 may proceed from block 306 to block 308. At block 308, the additional level of identification may be attempted. As described earlier, an additional level of identification may include asking the user to provide a passphrase through another voice input. Voice recognition engine 204a may analyze the semantic content of the additional voice input to determine if the semantic content matches the expected/required passphrase. Further, if needed, additional levels of identification such as identification of lip synchronization, and/or location synchronization may be attempted.

If successful (succ), for the service agent 206, process 300, from block 308, may return to block 306 to confirm the adequate levels of identification are now in place. As described earlier, on confirmation that the required level of identification is now in place, for the service agent 206, process 300, from block 306, may proceed to block 310. At block 310, the service agent 206 may provide or facilitate the requested service. Thereafter, for the service agent 206, process 300 may proceed to block 314, to return to block 304, rejoining other service agents 206 waiting for service requests. From block 304, process 300 may continue as earlier described.

On the other hand, if at block 308, process 300 fails to acquire the necessary additional level(s) of identification to provide the requested service, for the service agent 206, process 300 may proceed to block 312. At block 312, the service agent 206 may deny the requested service, and return to block 304. Again, from block 304, process 300 may continue as earlier described.

Back at block 304, if a result of determination indicates that no service is requested, another determination may be made to determine if termination of process 300 is requested. If not, process 300 may return to block 304, and await for service request. If termination of process 300 is requested, process 300 may end.

As described earlier, in embodiments, the services may include customized provision of multi-media content for consumption, e-commerce, and/or financial services. For example, for customized provision of multi-media content, on establishing identification of the required level, a multi-media player may adapt a multi-media presentation including, but are not limited to, loading the identified user's preference automatically
switching to the identified user's favorite channels or last watching channel/movie
loading a conversation history between the identified user and a set-top box for better understanding current conversation.
loading alerts, notifications and calendar specific to the identified user
recommending channels/contents based on the watching history of the identified user
displaying advertisements specifically targeted to the identified user
retrieving emails of the identified user
displaying news filtered for the identified user or subscribed by the identified user
analyzing the identified user's behaviors for pushing more relevant information
identifying the speaker of video telephone and displaying information of the speaker
customize response to a service call from the identified user In another service scenario, a service that requires log in may be provided as follows:
1) A user may start the processing by saying to the client device: "Hi."
2) The client device may analyze the voice bio-metric of the voice and finds a match in a registered user bio-metric database; the client device may then load the identified user's information and responses to identified user by voice, saying e.g., "Hello, dear David, what can I do for you?".

3) User David may then say to the client device: "Log me in to Youtube."

4) The client device may determine the log-in requires an additional level of identification, and respond by voice, saying e.g., "please face the camera and say your passphrase."

5) User David may then face the camera and say "this is David."

6) The client device may then confirm both the user's face and voice match the user's information in database, and after vocally and facially identified David, the client device may then proceed to load the user name and password for David's Youtube login, and log David into his Youtube account.

In still another service scenario, a service that requires very high level identification, such as banking service, may be provided a user who wants to transfer money from his bank account to pay for an on-line purchase, as follows:

the user, with initial identifications, may hold his bank card to a camera of the client device and say: "Hi, this is my bank card";

the client device may first identify the bank card number and bank name, and determine that a higher level of identification is required;

on determination, the client device may response by saying e.g., "please face the camera and say your bank passphrase;

the user may then respond by facing the camera and say "it is David, and my birthday is August 1980."

in response, in addition to extracting the substance of the voice input, the client device may:

a. check whether the user's lip movement as seen from an image input is in sync with the voice input;

b. check whether the user's location recognized as the voice source is the same as the user's location recognized through visual recognition;

c. check and determine whether the user's environment is consistent with the location identified (to prevent video recording cheat);

on confirmation that all the additional checks/identifications have passed, the client device may then proceed to send the user's log in information and voice passphrase to the bank system;

further, the client device may subsequently inform the user the transaction is successful, after the bank system has returned the successful result of the transaction.

Figure 3:
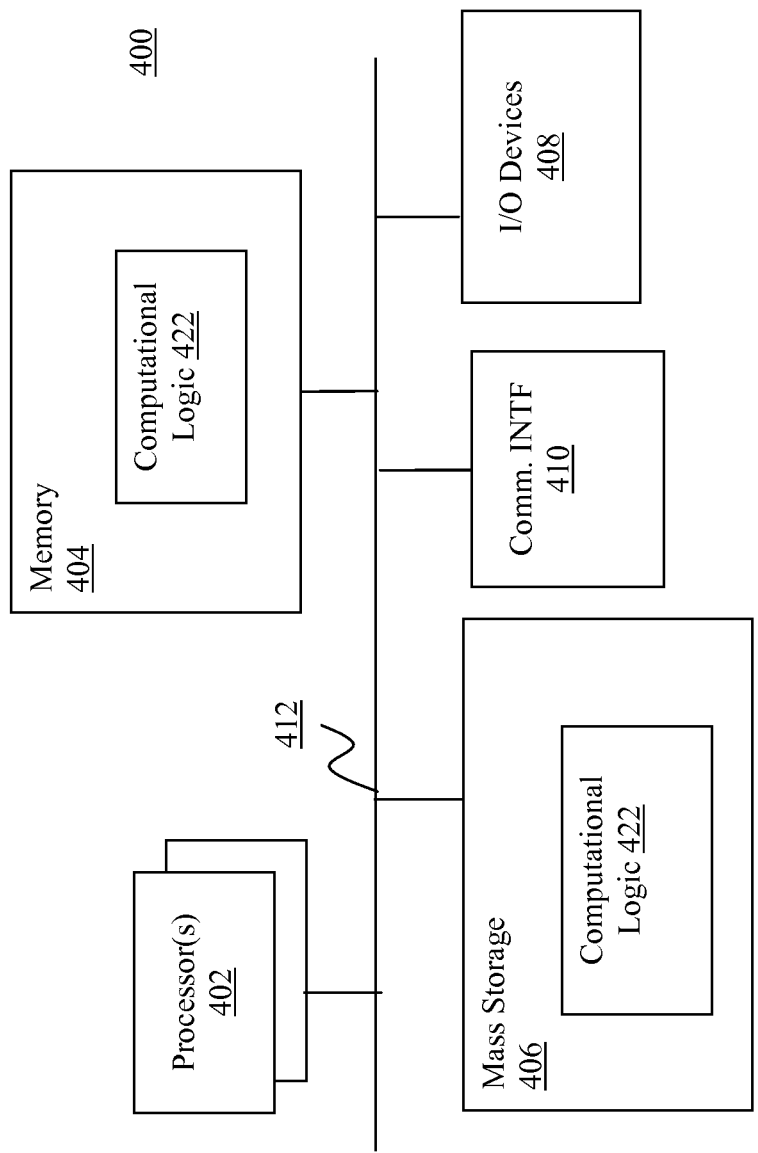
FIG. 3 illustrates an example computing system suitable for use as a client device, in accordance with various embodiments.

Referring now to FIG. 3, wherein an example computer suitable for use as a client device, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage devices 406 may be employed to store a working copy and a permanent copy of the programming instructions implementing the operations associated with practicing method 300 of FIG. 2 client devices 102, earlier described. The various elements may be implemented by assembler instructions supported by processor(s) 402 or high-level languages, such as, for example, C, that can be compiled into such instructions.

The permanent copy of the programming instructions may be placed into permanent storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

Figure 4:
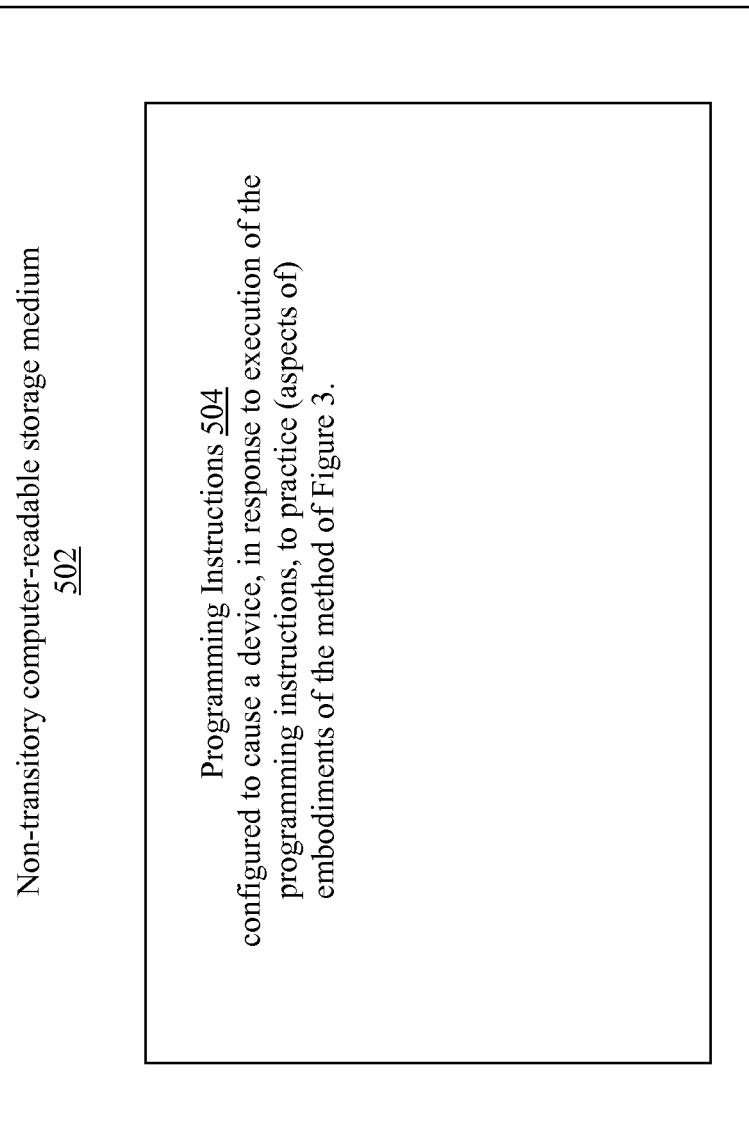
FIG. 4 illustrates an example storage medium with instructions configured to enable an apparatus to practice the processes of the present disclosure, in accordance with various embodiments.

FIG. 4 illustrates an example non-transitory computer-readable storage medium having instructions configured to practice all or selected ones of the operations associated with method 300 of FIG. 2, earlier described; in accordance with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of process 300 of FIG. 2, e.g., but not limited to, the operations performed in association with establishing one or more levels of user identifications, and providing/facilitating services based of the level of voice/facial identification established.

Referring back to FIG. 3, for one embodiment, at least one of processors 402 may be packaged together with computational logic 422 configured to practice aspects of the process of FIG. 2. For one embodiment, at least one of processors 402 may be packaged together with computational logic 422 configured to practice aspects of the process of FIG. 3 to form a System in Package (SiP). For one embodiment, at least one of processors 402 may be integrated on the same die with computational logic 422 configured to practice aspects of the process of FIG. 3. For one embodiment, at least one of processors 402 may be packaged together with computational logic 422 configured to practice aspects of the process of FIG. 3 to form a System on Chip (SoC). For at least one embodiment, the SoC may be utilized in, e.g., but not limited to, a computing tablet.

The following paragraphs describe examples of various embodiments.

Example 1 may be an apparatus having a voice recognition engine and a facial recognition engine configured to provide, individually or in cooperation with each other, identification of a user of the apparatus at a plurality of identification levels. The apparatus may further include a service agent coupled with at least one of the voice recognition engine and the facial recognition engine, and configured to provide a service to the user, after the user has been identified at least at an identification level required to receive the service.

Example 2 may be example 1, wherein the voice recognition engine is configured to individually provide identification of a user at a first identification level in response to a voice input, and to cooperate with the facial recognition engine to provide identification of the user at a second identification level that is a higher identification level than the first identification level, enabling the user to be eligible for service that requires at least the second identification level.

Example 3 may be example 2, wherein the voice recognition engine is configured to individually provide identification of the user at the first identification level in response to the voice input, via comparison of the voice input to a plurality of voice templates.

Example 4 may be example 3, wherein the voice recognition engine is configured to compare the voice input to the plurality of voice templates employing one of a frequency estimation technique, a Markov model technique, a Guassian mixture model technique, a pattern matching technique, a neural network technique, a matrix representation technique, a vector quantization technique or a decision tree technique.

Example 5 may be example 2, wherein the voice input is a first voice input, and the voice recognition engine is configured to individually provide identification of the user at the first identification level in response to the first voice input, by comparing the first voice input to a plurality of voice templates; wherein the voice recognition engine is further configured to individually provide identification of the user at a third identification level in response to a second voice input, wherein the third identification level is a higher identification level than the second identification level, enabling the user to be eligible for service that requires at least the third identification level.

Example 5 may be example 2, wherein the voice input is a first voice input, and the voice recognition engine is configured to individually provide identification of the user at the first identification level in response to the first voice input, by comparing the first voice input to a plurality of voice templates; wherein the voice recognition engine is further configured to individually provide identification of the user at a third identification level in response to a second voice input, wherein the third identification level is a higher identification level than the second identification level, enabling the user to be eligible for service that requires at least the third identification level.

Example 6 may be example 5, wherein the voice recognition engine is configured to determine a semantic content of the second voice input and compare the semantic content of the second voice input to a semantic reference.

Example 7 may be example 6, wherein the semantic reference is a passphrase.

Example 8 may be example 1, wherein the facial recognition engine is configured to individually provide identification of a user at a first identification level in response to an image input, and to cooperate with the voice recognition engine to provide identification of the user at a second identification level that is a higher identification level than the first identification level, enabling the user to be eligible for service that requires at least the second identification level.

Example 9 may be example 8, wherein the facial recognition engine is configured to individually provide identification of the user at the first identification level via comparison of the image input to a plurality of reference images.

Example 10 may be example 9, wherein the facial recognition engine is configured to compare the image input to the plurality of reference images via at least analysis of relative positions, sizes or shapes of eyes, nose, cheekbones, or jaws.

Example 11 may be any one of examples 1-10, wherein the service agent is configured to provide customized multi-media presentation service that requires an identification level that includes first and second identifications of the user by both the voice recognition engine, and the facial recognition engine.

Example 12 may be any one of examples 1-10, wherein the service agent is configured to facilitate access to an online service, that requires an identification level that includes first and second identifications of the user by both the voice recognition engine and the facial recognition engine based correspondingly on a first voice input and an image input, and a third identification by the voice recognition engine based on semantic content of a second voice input.

Example 13 may be any one of examples 1-10, wherein the service agent is configured to facilitate access to an online service, that requires an identification level that includes first and second identifications of the user by both the voice recognition engine and the facial recognition engine based correspondingly on a first voice input and an image input, a third identification by the voice recognition engine based on semantic content of a second voice input, and at least a fourth identification that uses both the voice recognition engine and the facial recognition engine.

Example 14 may be example 13, wherein the fourth identification comprises identifying synchronization of a real time voice input to the voice recognition engine, with lip movements in a real time image input to the facial recognition engine.

Example 15 may be example 13, wherein the fourth identification comprises identifying synchronization of a location of a voice source providing a voice input to the voice recognition engine, with a location of the user determined based on image input to the facial recognition engine.

Example 16 may be example 13, wherein the online service comprises an online financial service.

Example 17 may be any one of examples 1-10, wherein the apparatus is a selected one of a television set, a set-top box, a smartphone, a computing tablet, an ultrabook, a laptop computer or a desktop computer.

Example 18 may be a method for providing service. The method may include providing, by a computing device, identification of a user of the computing device at a plurality of identification levels, via a voice recognition engine, a facial recognition engine, or both, individually or in cooperation with each other; and providing, by the computing device, a service to the user, after the user has been identified at least at an identification level required to receive the service.

Example 19 may be example 18, wherein providing identification of a user comprises the voice recognition engine individually providing identification of a user at a first identification level in response to a voice input, and cooperating with the facial recognition engine to provide identification of the user at a second identification level that is a higher identification level than the first identification level, enabling the user to be eligible for service that requires at least the second identification level.

Example 20 may be example 19, wherein the voice recognition engine individually providing identification of a user comprises the voice recognition engine individually providing identification of the user at the first identification level in response to the voice input, by comparing the voice input to a plurality of voice templates.

Example 21 may example 20, wherein the voice recognition engine comparing the voice input to a plurality of voice templates comprises the voice recognition engine comparing the voice input to the plurality of voice templates employing one of a frequency estimation technique, a Markov model technique, a Guassian mixture model technique, a pattern matching technique, a neural network technique, a matrix representation technique, a vector quantization technique or a decision tree technique.

Example 22 may be example 19, wherein the voice input is a first voice input, and the voice recognition engine individually providing identification of the user at the first identification level in response to the first voice input, by comparing the first voice input to a plurality of voice templates; wherein the voice recognition engine further individually provides identification of the user at a third identification level in response to a second voice input, wherein the third identification level is a higher identification level than the second identification level, enabling the user to be eligible for service that requires at least the third identification level.

Example 23 may be example 22, wherein the voice recognition engine individually provides identification of the user at a third identification level in response to a second voice input comprises the voice recognition engine determines a semantic content of the second voice input and compares the semantic content of the second voice input to a semantic reference.

Example 24 may be example 23, wherein the semantic reference is a passphrase.

Example 25 may be example 18, wherein providing identification of a user of the computing device at a plurality of identification levels, via a facial recognition engine, comprises the facial recognition engine individually providing identification of a user at a first identification level in response to an image input, and cooperating with the voice recognition engine to provide identification of the user at a second identification level that is a higher identification level than the first identification level, enabling the user to be eligible for service that requires at least the second identification level.

Example 26 may be example 25, wherein the facial recognition engine individually providing identification of a user comprises the facial recognition engine individually providing identification of the user at the first identification level by comparing the image input to a plurality of reference images.

Example 27 may be example 26, wherein the facial recognition engine individually providing identification of the user at the first identification level by comparing the image input to a plurality of reference images comprises the facial recognition engine comparing the image input to the plurality of reference images via at least analysis of relative positions, sizes or shapes of eyes, nose, cheekbones, or jaws.

Example 28 may be any one of examples 18-27, wherein providing a service to the user, after the user has been identified at least at an identification level required to receive the service comprises providing customized multi-media presentation service that requires an identification level that includes first and second identifications of the user by both the voice recognition engine, and the facial recognition engine.

Example 29 may be any one of examples 18-27, wherein providing a service to the user, after the user has been identified at least at an identification level required to receive the service comprises facilitating access to an online service, that requires an identification level that includes first and second identifications of the user by both the voice recognition engine and the facial recognition engine based correspondingly on a first voice input and an image input, and a third identification by the voice recognition engine based on semantic content of a second voice input.

Example 30 may be any one of examples 18-27, wherein providing a service to the user, after the user has been identified at least at an identification level required to receive the service comprises facilitating access to an online service, that requires an identification level that includes first and second identifications of the user by both the voice recognition engine and the facial recognition engine based correspondingly on a first voice input and an image input, a third identification by the voice recognition engine based on semantic content of a second voice input, and at least a fourth identification that uses both the voice recognition engine and the facial recognition engine.

Example 31 may be example 30, wherein the fourth identification comprises identifying synchronization of a real time voice input to the voice recognition engine, with lip movements in a real time image input to the facial recognition engine.

Example 32 may be example 30, wherein the fourth identification comprises identifying synchronization of a location of a voice source providing a voice input to the voice recognition engine, with a location of the user determined based on image input to the facial recognition engine.

Example 33 may be example 30, wherein the online service comprises an online financial service.

Example 34 may be at least one storage medium comprising a plurality of instructions configured to cause a client device, in response to execution of the instructions, to perform any one of the methods of examples 18-33.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for providing online services, comprising:
a voice recognition engine and a facial recognition engine to provide, individually or in cooperation with each other, identification of a user of the apparatus at a plurality of identification levels; and
one or more service agents coupled with at least one of the voice recognition engine and the facial recognition engine, to conditionally provide at least a first, a second, and a third online service to the user;
wherein the first online service requires the user having been identified by the voice recognition engine and the facial recognition engine, individually or in cooperation, at least at a first identification level, and the first online service is provided after the user has been identified at least at the first identification level;
wherein the second online service requires the user having been identified by the voice recognition engine and the facial recognition engine, individually or in cooperation, at least at a second identification level higher than the first identification level, and the second online service is provided after the user has been identified at least at the second identification level; and
wherein the third online service requires the user having been identified by the voice recognition engine and the facial recognition engine, individually or in cooperation, at least at a third identification level higher than the second identification level, and the third online service is provided after the user has been identified at least at the third identification level.

2. The apparatus of claim 1, wherein the voice recognition engine is to individually provide identification of a user at the first identification level in response to a voice input, and to cooperate with the facial recognition engine to provide identification of the user at the second identification level.

3. The apparatus of claim 2, wherein the voice recognition engine is to individually provide identification of the user at the first identification level in response to the voice input, via comparison of the voice input to a plurality of voice templates.

4. The apparatus of claim 3, wherein the voice recognition engine is to compare the voice input to the plurality of voice templates employing one of a frequency estimation technique, a Markov model technique, a Guassian mixture model technique, a pattern matching technique, a neural network technique, a matrix representation technique, a vector quantization technique or a decision tree technique.

5. The apparatus of claim 2, wherein the voice input is a first voice input, and the voice recognition engine is to individually provide identification of the user at the first identification level in response to the first voice input, by comparing the first voice input to a plurality of voice templates; wherein the voice recognition engine is further to individually provide identification of the user at the third identification level in response to a second voice input.

6. The apparatus of claim 5, wherein the voice recognition engine is to determine a semantic content of the second voice input and compare the semantic content of the second voice input to a semantic reference.

7. The apparatus of claim 6, wherein the semantic reference is a passphrase.

8. The apparatus of claim 1, wherein the facial recognition engine is to individually provide identification of a user at the first identification level in response to an image input, and to cooperate with the voice recognition engine to provide identification of the user at the second identification level.

9. The apparatus of claim 8, wherein the facial recognition engine is to individually provide identification of the user at the first identification level via comparison of the image input to a plurality of reference images.

10. The apparatus of claim 9, wherein the facial recognition engine is to compare the image input to the plurality of reference images via at least analysis of relative positions, sizes or shapes of eyes, nose, cheekbones, or jaws.

11. The apparatus of claim 1, wherein the service agent is to provide customized multi-media presentation service that requires an identification level that includes first and second identifications of the user by both the voice recognition engine, and the facial recognition engine.

12. The apparatus of claim 1, wherein the one or more service agents comprise a first, a second, and a third service agent to respectively facilitate access to to the first, second, and third online services.

13. The apparatus of claim 1, wherein the one or more service agents is to further provide a fourth online service, that requires the user having been identified at least at a fourth identification level higher than the third identification level, and the third online service is provided after the user has been identified at least at the fourth identification level;
wherein the first and second identification levels comprise respective identifications of the user by the voice recognition engine and the facial recognition engine based correspondingly on a first voice input and an image input;
wherein the third identification level comprises identification of the user by the voice recognition engine based on semantic content of a second voice input; and
wherein the fourth identification level comprises identification of the user that uses both the voice recognition engine and the facial recognition engine.

14. The apparatus of claim 13, wherein the fourth identification level comprises identifying synchronization of a real time voice input to the voice recognition engine, with lip movements in a real time image input to the facial recognition engine.

15. The apparatus of claim 13, wherein the fourth identification level comprises identifying synchronization of a location of a voice source providing a voice input to the voice recognition engine, with a location of the user determined based on image input to the facial recognition engine.

16. A computer-implemented method for providing online service, comprising:
providing, by a computing device, identification of a user of the computing device at a plurality of identification levels, via a voice recognition engine, a facial recognition engine, or both, individually or in cooperation with each other; and
conditionally providing, by the computing device, at least a first, a second, or a third online service to the user;
wherein the first online service requires the user having been identified by the voice recognition engine and the facial recognition engine, individually or in cooperation, at least at a first identification level, and the first online service is provided after the user has been identified at least at the first identification level required to receive the service;
wherein the second online service requires the user having been identified by the voice recognition engine and the facial recognition engine, individually or in cooperation, at least at a second identification level higher than the first identification level, and the second online service is provided after the user has been identified at least at the second identification level; and
wherein the third online service requires the user having been identified by the voice recognition engine and the facial recognition engine, individually or in cooperation, at least at a third, identification level higher than the second identification level, and the third online service is provided after the user been identified at least at the third identification level.

17. The method of claim 16, wherein providing identification of a user comprises the voice recognition engine individually providing identification of a user at the first identification level in response to a voice input, and cooperating with the facial recognition engine to provide identification of the user at the second identification level.

18. The method of claim 16, wherein the voice input is a first voice input, and the voice recognition engine individually providing identification of the user at the first identification level in response to the first voice input, by comparing the first voice input to a plurality of voice templates; wherein the voice recognition engine further individually provides identification of the user at the third identification level in response to a second voice input.

19. The method of claim 18, wherein the voice recognition engine individually provides identification of the user at the third identification level in response to a second voice input comprises the voice recognition engine determines a semantic content of the second voice input and compares the semantic content of the second voice input to a semantic reference.

20. The method of claim 16, wherein providing identification of a user of the computing device at a plurality of identification levels, via a facial recognition engine, comprises the facial recognition engine individually providing identification of a user at the first identification level in response to an image input, and cooperating with the voice recognition engine to provide identification of the user at the second identification level.

21. The method of claim 16, wherein conditionally providing a first, a second, and a third online, service to the user comprises conditionally providing customized multi-media presentation service that requires at least the second identification level, wherein the second identification level includes respective first and second identifications of the user by the voice recognition engine and the facial recognition engine.

22. The method of claim 16, wherein providing the third online service to the user, comprises providing the third online service after respective first and second identifications of the user by the voice recognition engine and the facial recognition engine based correspondingly on a first voice input and an image input, and a third identification by the voice recognition engine based on semantic content of a second voice input.

23. The method of claim 16, further comprising conditionally providing a fourth online service to the user that requires the user having been identified by the voice recognition engine and the facial recognition engine, individually or in cooperation, at least at a fourth identification level higher than the third identification level, and the fourth online service is provided after the user has been identified at least at the fourth identification level, wherein the first and second identification levels respectively includes first and second identifications of the user by the voice recognition engine and the facial recognition engine based correspondingly on a first voice input and an image input, the third identification level includes identification by the voice recognition engine based on semantic content of a second voice input, and the fourth identification level includes identification that uses both the voice recognition engine and the facial recognition engine.

24. The method of claim 23, wherein the fourth identification level comprises identifying synchronization of a real time voice input to the voice recognition engine, with lip movements in a real time image input to the facial recognition engine.

25. The method of claim 23, wherein the fourth identification level comprises identifying synchronization of a location of a voice source providing a voice input to the voice recognition engine, with a location of the user determined based on image input to the facial recognition engine.

26. At least one non-transitory computer-readable medium comprising a plurality of instructions to cause a client device, in response to execution of the instructions, to:
provide identification of a user of the client device at a plurality of identification levels, via a voice recognition engine, a facial recognition engine, or both, individually or in cooperation with each other; and
conditionally provide a first, a second or a third online service to the user;
wherein the first online service requires the user having been identified by the voice recognition engine and the facial recognition engine, individually or in cooperation, at least at a first identification level, and the first online service is provided after the user has been identified at least at the first identification level;
wherein the second online service requires the user having been identified by the voice recognition engine and the facial recognition engine, individually or in cooperation, at least at a second identification level higher than the first identification level, and the second online service is provided after the user has been identified at least at the second identification level; and
wherein the third online service requires the user having been identified by the voice recognition engine and the facial recognition engine, individually or in cooperation, at least at a third identification level higher than the second identification level, and the third online service is provided after the user has been identified at least at the third identification level.

* * * * *